US008541992B2

(12) United States Patent
Bergveld et al.

(10) Patent No.: US 8,541,992 B2
(45) Date of Patent: Sep. 24, 2013

(54) VOLTAGE CONVERTER

(75) Inventors: Hendrik Johannes Bergveld, Eindhoven (NL); Franciscus Adrianus Cornelis Maria Schoofs, Valkenswaard (NL)

(73) Assignee: NXP B.V., Eindhoven (NL)

( * ) Notice: Subject to any disclaimer, the term of this patent is extended or adjusted under 35 U.S.C. 154(b) by 342 days.

(21) Appl. No.: 13/061,127

(22) PCT Filed: Aug. 18, 2009

(86) PCT No.: PCT/IB2009/053630
§ 371 (c)(1),
(2), (4) Date: Feb. 25, 2011

(87) PCT Pub. No.: WO2010/023595
PCT Pub. Date: Mar. 4, 2010

(65) Prior Publication Data
US 2011/0156668 A1    Jun. 30, 2011

(30) Foreign Application Priority Data

Aug. 29, 2008  (EP) .................................. 08105186

(51) Int. Cl.
*G05F 1/577* (2006.01)
(52) U.S. Cl.
USPC ............................ 323/267; 323/274; 327/554
(58) Field of Classification Search
USPC ......... 323/222, 266, 267, 271–276, 280–288; 363/16–17, 21.03, 21.06, 40, 59, 62, 89, 363/65; 327/149, 150, 156, 165
See application file for complete search history.

(56) References Cited

U.S. PATENT DOCUMENTS

| 4,428,040 | A | | 1/1984 | Yamashiro et al. |
|---|---|---|---|---|
| 4,868,908 | A | * | 9/1989 | Pless et al. ..................... 323/267 |
| 5,414,614 | A | | 5/1995 | Fette et al. |
| 5,592,072 | A | * | 1/1997 | Brown .......................... 323/268 |
| 5,806,693 | A | * | 9/1998 | Carbonaro ...................... 211/96 |
| 6,175,223 | B1 | * | 1/2001 | Martinez et al. .............. 323/274 |
| 6,512,411 | B2 | * | 1/2003 | Meng et al. ................... 327/536 |
| 6,573,695 | B2 | * | 6/2003 | Shashoua ...................... 323/282 |
| 7,098,636 | B2 | * | 8/2006 | Koerner et al. ............... 323/268 |
| 7,486,058 | B2 | * | 2/2009 | Szepesi ......................... 323/272 |
| 7,911,191 | B2 | * | 3/2011 | Lewis ........................... 323/273 |
| 2002/0089313 | A1 | | 7/2002 | Shashoua |
| 2002/0167299 | A1 | | 11/2002 | Curtin |
| 2004/0178776 | A1 | | 9/2004 | Hansen et al. |

FOREIGN PATENT DOCUMENTS

EP    0 866 545 A1    9/1998
GB    2 421 811 A    7/2006

OTHER PUBLICATIONS

Makowski, M. : "Realizability Conditions and Bounds on Synthesis of Switched-Capacitor DC-DC Voltage Multiplier Circuits," IEEE Transactions on Circuits and Systems, I: Fundamental Theory and Applications, vol. 44, No. 8, pp. 684-691, (Aug. 1997).

(Continued)

*Primary Examiner* — Rajnikant Patel

(57) ABSTRACT

A DC voltage converter, comprising: a multi-ratio capacitive converter; a linear voltage regulator in series with the multi-ratio capacitive converter; and a controller; the controller arranged to control the ratio of the multi-ratio capacitive converter dependent upon the voltage difference across the linear voltage regulator.

15 Claims, 4 Drawing Sheets

(56) References Cited

OTHER PUBLICATIONS

Makowski, M., et al. : "Performance Limits of Switched-Capacitor DC-DC Converters," 26th Annual IEEE Power Electronics Specialists Conference, vol. 2, pp. 1215-1221, (1995).

International Search Report for Int'l Patent Appln. No. PCT/IB2009/053630.

Sable, Dan, et al; "Cost Effective Hybrid DC-DC Converter Radiation Performance" IEEE Explore; 5 pages (2007).

* cited by examiner

VOLTAGE CONVERTER

The present invention relates to DC voltage converters, and methods of converting DC voltages.

Several methods exist to convert one DC supply voltage into another. Particularly, for example in mobile devices, the number of these necessary voltage conversions is increasing. At the same time the autonomy of the mobile device should not be compromised. This conventionally leads to the use of switched-mode DC/DC converters using either capacitors or inductors to temporarily store energy that is transferred from the input (e.g. battery) to the load. This holds particularly for larger voltage differences, since then the efficiency of switched-mode converters is superior compared to linear regulators. Also, it is known to use a linear regulator at the output of a switched-mode DC/DC converter to additionally regulate the output of the switched-mode DC/DC converter but without any interaction as such between the switched-mode DC/DC converter and the linear regulator. One example of this is described in US 2002/167299 A1. Another example of a voltage regulator used in a serial but non-interactive manner with a voltage converter is described in GB-A-2 421 811.

With the continuing drive towards miniaturization of power supplies the passive components of such switched-mode converters is preferably integrated with the active silicon in a single package. As a result of the smaller volume available for energy storage, the inductance and capacitance of these integrated passive components decrease. For integrated inductive converters in particular, some specifications of the integrated inductor are seriously degraded compared to its external counterparts. Therefore, achieving good efficiency may become difficult depending on the application.

A problem with capacitive converters is their inability to generate a defined and controlled output voltage with good load and line regulation. Once a ratio between input and output voltage has been chosen based on the circuit topology, i.e. the way in which capacitors are switched alternatively in series and parallel, the output voltage remains a fixed ratio of the input voltage. Therefore, if the input voltage varies, as it will do in e.g. practical battery-powered mobile applications, the output voltage varies accordingly. Since the capacitive converter can be represented as a voltage-controlled voltage source of $NV_{in}$, with N the transfer ratio larger than or smaller than 1, in series with an output impedance that depends amongst others on the topology and the series resistance of switches and equivalent series resistance (ESR) of capacitors, the output voltage will also change when the load current varies. Limited control of the output voltage is possible by varying the converter impedance, e.g. by changing the switching frequency, duty cycle (typically chosen to be 50%) or capacitance values. However, these methods fundamentally involve sacrificing efficiency for controllability, while the control range of $V_{out}$ still remains limited.

Multi-ratio capacitive converters are known. The following two articles describe analytical methods for implementing a capacitive converter with multiple ratios using relatively low amounts of hardware:

[1] M. S. Makowski, D. Maksimovic, "Performance limits of switched-capacitor DC-DC converters", 26th Annual IEEE Power Electronics Specialists Conference (PESC), vol. 2, PESC'95, pp. 1215-1221; and
[2] M. S. Makowski, "Realizability conditions and bounds on synthesis of switched-capacitor DC-DC voltage multiplier circuits", IEEE Trans Circ. Syst. I, vol. 44, no. 8, pp. 684-691, August 1997. The contents of these two articles are incorporated herein by reference.

In a first aspect, the present invention provides a DC voltage converter, comprising: a multi-ratio capacitive converter; a linear voltage regulator in series with the multi-ratio capacitive converter; and a controller; the controller arranged to control the ratio of the multi-ratio capacitive converter dependent upon the voltage difference across the linear voltage regulator.

The controller may control the ratio of the multi-ratio capacitive converter such as to maintain the voltage difference across the linear voltage regulator within a predetermined voltage window.

The predetermined voltage window may be between a minimum voltage which is the drop-out voltage or close to and above the drop-out voltage of the linear voltage regulator, and a maximum voltage. The maximum voltage may be dependent on the ratio of the multi-ratio capacitive converter.

The controller may control the ratio of the multi-ratio capacitive converter such as to minimise the voltage difference across the linear voltage regulator.

The controller may control the ratio of the multi-ratio capacitive converter such as to control the voltage difference across the linear voltage regulator to be close to and above the drop-out voltage of the linear voltage regulator.

The controller may comprise an analogue to digital converter and a digital processor.

The controller may comprise an internal state machine.

The multi-ratio capacitive converter may have four different ratios.

The DC voltage converter may further comprise means for accommodating ripple on the output of the multi-ratio capacitive converter.

In a further aspect, the present invention provides a method of converting DC voltage, the method comprising: inputting an input voltage to a multi-ratio capacitive converter; the multi-ratio capacitive converter converting the input voltage to an intermediate voltage; feeding the intermediate voltage to a linear voltage regulator and also to a controller; the linear voltage regulator regulating the intermediate voltage to an output voltage; feeding the output voltage to the controller and also providing the output voltage as the overall output voltage; and the controller controlling the ratio of the multi-ratio capacitive converter dependent upon the difference between the output voltage and the intermediate voltage.

The controller may control the ratio of the multi-ratio capacitive converter such as to maintain the difference between the output voltage and the intermediate voltage within a predetermined voltage window.

The predetermined voltage window may be between a minimum voltage which is the drop-out voltage or close to and above the drop-out voltage of the linear voltage regulator, and a maximum voltage.

The controller may control the ratio of the multi-ratio capacitive converter such as to minimise the difference between the output voltage and the intermediate voltage.

The controller may control the ratio of the multi-ratio capacitive converter such as to control the difference between the output voltage and the intermediate voltage to be close to and above the drop-out voltage of the linear voltage regulator.

In a further aspect, the present invention provides an apparatus for and a method of controlling the voltage difference across a series regulator to a value within a defined voltage window by means of controlling the ratio of a capacitive converter at the input of the linear regulator. Such a control scheme may be implemented based on AD conversion of the voltage difference across the linear series regulator and a digital processor including a state machine that changes state based on the value of the digitised voltage difference.

Embodiments of the present invention will now be described, by way of example, with reference to the accompanying drawings, in which.

Figure 1:
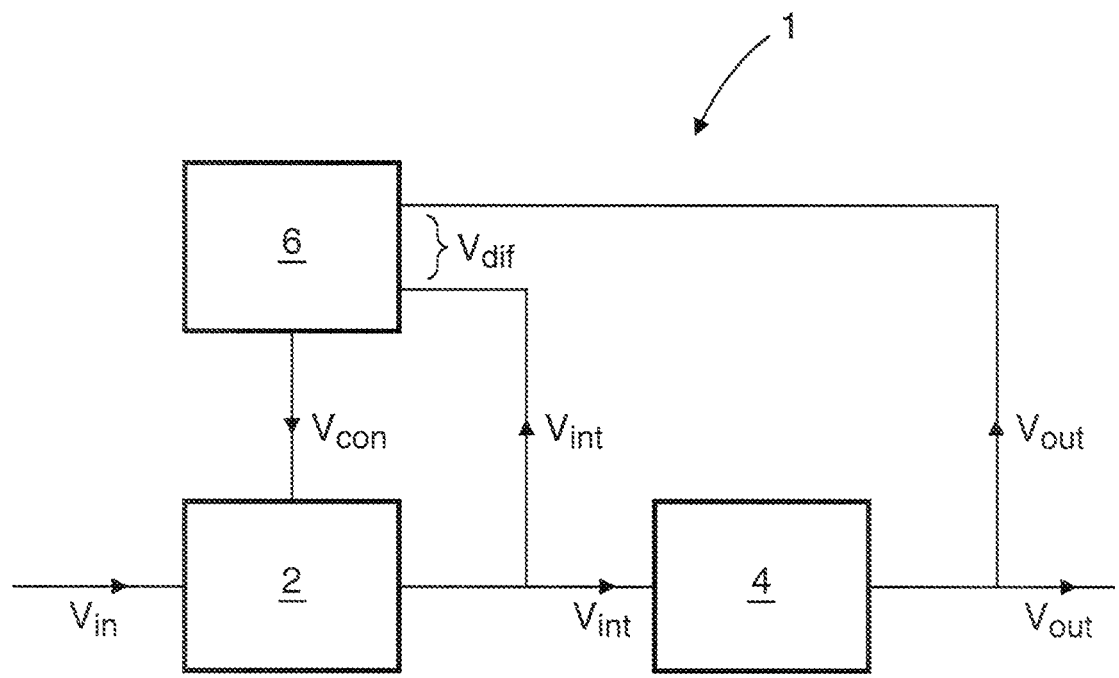
FIG. 1 is a block diagram of an embodiment of a DC voltage converter.

FIG. 1 is a block diagram of an embodiment of a DC voltage converter 1. The DC voltage converter 1 comprises a multi-ratio capacitive converter 2, a linear voltage regulator 4, and a controller 6.

The multi-ratio capacitive converter 2 comprises an input arranged to receive the input voltage ($V_{in}$) input to the DC voltage converter 1. The multi-ratio capacitive converter 2 further comprises a control input arranged to receive a control signal ($V_{con}$) from the controller 6. The multi-ratio capacitive converter 2 further comprises an output arranged to output an intermediate voltage ($V_{int}$) to an input of the linear voltage regulator 4 and to an input of the controller 6.

The linear voltage regulator 4 comprises its above mentioned input for receiving $V_{int}$ and an output arranged to output an output voltage ($V_{out}$) to a further input of the controller 6 and also as the overall output of the DC voltage converter 1.

The controller 6 comprises its above mentioned inputs and output all arranged as described above with relation to the multi-ratio capacitive converter 2 and the linear voltage regulator 4. $V_{out}$ and $V_{int}$ together provide a differential voltage $V_{dif}$ input into the controller 6.

Figure 2:
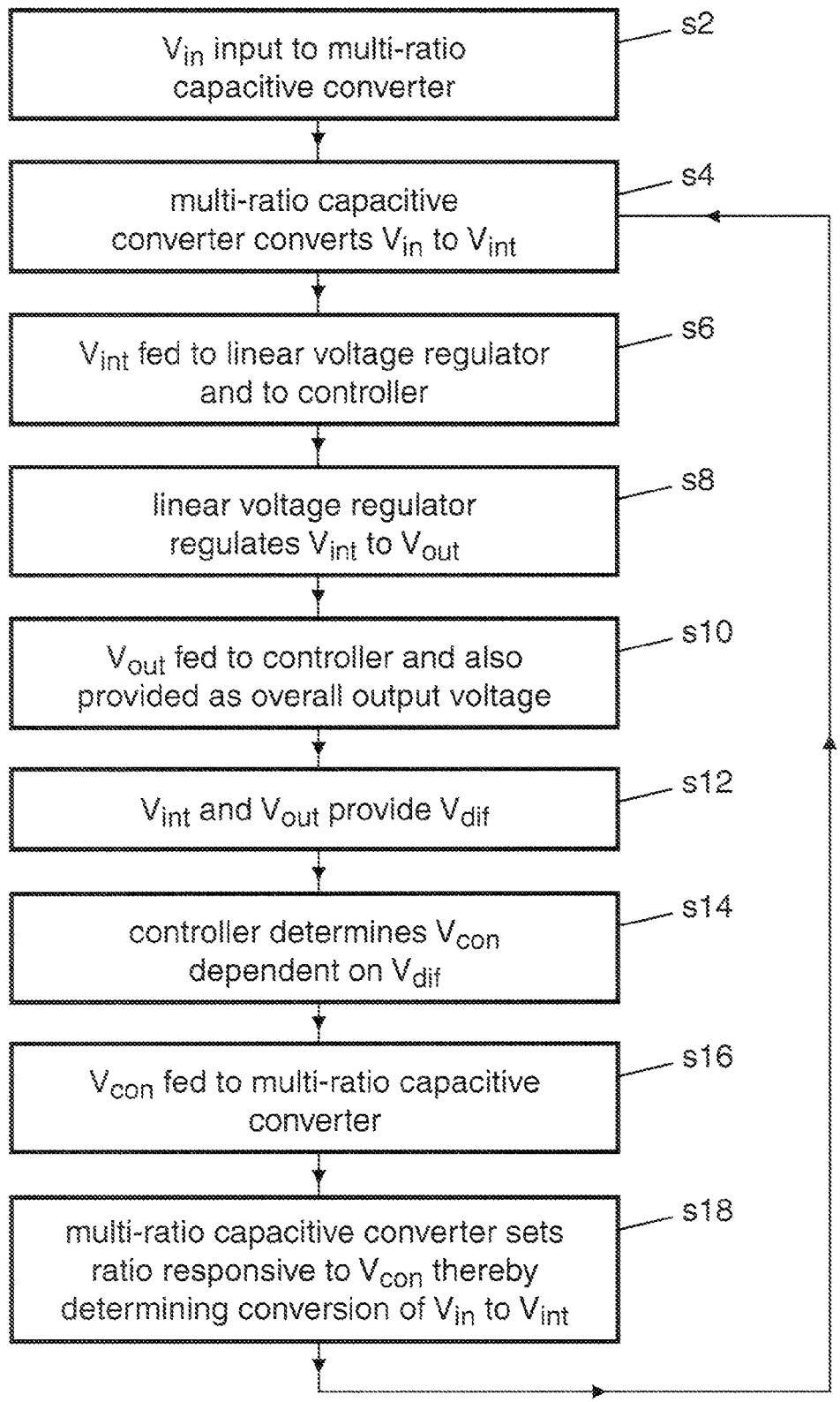
FIG. 2 is a process flow chart showing certain process steps carried out by a DC voltage converter in a method of DC voltage conversion.

FIG. 2 is a process flow chart showing certain process steps carried out by the DC voltage converter 1 in a method of DC voltage conversion. The method is in essence a type of ongoing feedback method in which the different component parts of the DC voltage converter 1 perform functions, in an interactive manner, simultaneously or at least overlapping to some extent temporally. However, for convenience and ease of understanding, in FIG. 2 and in the following account of FIG. 2, the process steps are depicted and described as discrete temporally-sequential steps.

At step s2, $V_{in}$ is input to the multi-ratio capacitive converter 2.

At step s4, the multi-ratio capacitive converter 2 converts $V_{in}$ to $V_{int}$.

At step s6, $V_{int}$ is fed from the multi-ratio capacitive converter 2 to the linear voltage regulator 4 and to the controller 6.

At step s8, the linear voltage regulator regulates $V_{int}$ to $V_{out}$.

At step s10, $V_{out}$ is fed from the linear voltage regulator 4 to the controller 6 and is also provided as the overall output voltage of the DC voltage converter 1.

At step s12, $V_{int}$ and $V_{out}$ are differenced to provide $V_{dif}$ at the controller 6.

At step s14, the controller 6 determines a control signal $V_{con}$ dependent on $V_{dif}$.

At step s16, $V_{con}$ is fed to the multi-ratio capacitive converter 2 from the controller 6.

At step s18, the multi-ratio capacitive converter 2 sets its (voltage conversion) ratio responsive to the received $V_{con}$ thereby determining the conversion of $V_{in}$ to $V_{out}$ which is implemented in step s4.

Thus this embodiment, as described above, provides a linear voltage regulator 4 in series with a capacitive converter 2 in which multiple conversion ratios can be selected. The linear voltage regulator 4 can only achieve down conversion and its efficiency equals its output voltage ($V_{out}$) divided by its input voltage (here $V_{int}$). Therefore, to provide efficient behaviour, its input voltage ($V_{int}$) is made only slightly higher than its output voltage ($V_{out}$). In practice, the minimum voltage for which the linear voltage regulator 4 is still able to control its output voltage as its input voltage and/or output current vary is called the drop-out voltage. For example, below this drop-out voltage a series transistor used for example in the linear voltage regulator can no longer deliver the required output current at the valid voltage across its terminals (e.g. insufficient gate-source voltage (VGS) available for driving the output transistor in the case of, in this embodiment, MOSFET (note in other embodiments types other than MOSFET may be used, for example a bipolar transistor). Therefore, optimally the voltage difference across the linear voltage regulator 4 should remain as close as possible to the drop-out voltage, but should not drop below it.

Further details of the above embodiment may be implemented in any suitable manner. In this particular example, further details are as described below with reference to FIGS. 3 and 4.

Figure 3:
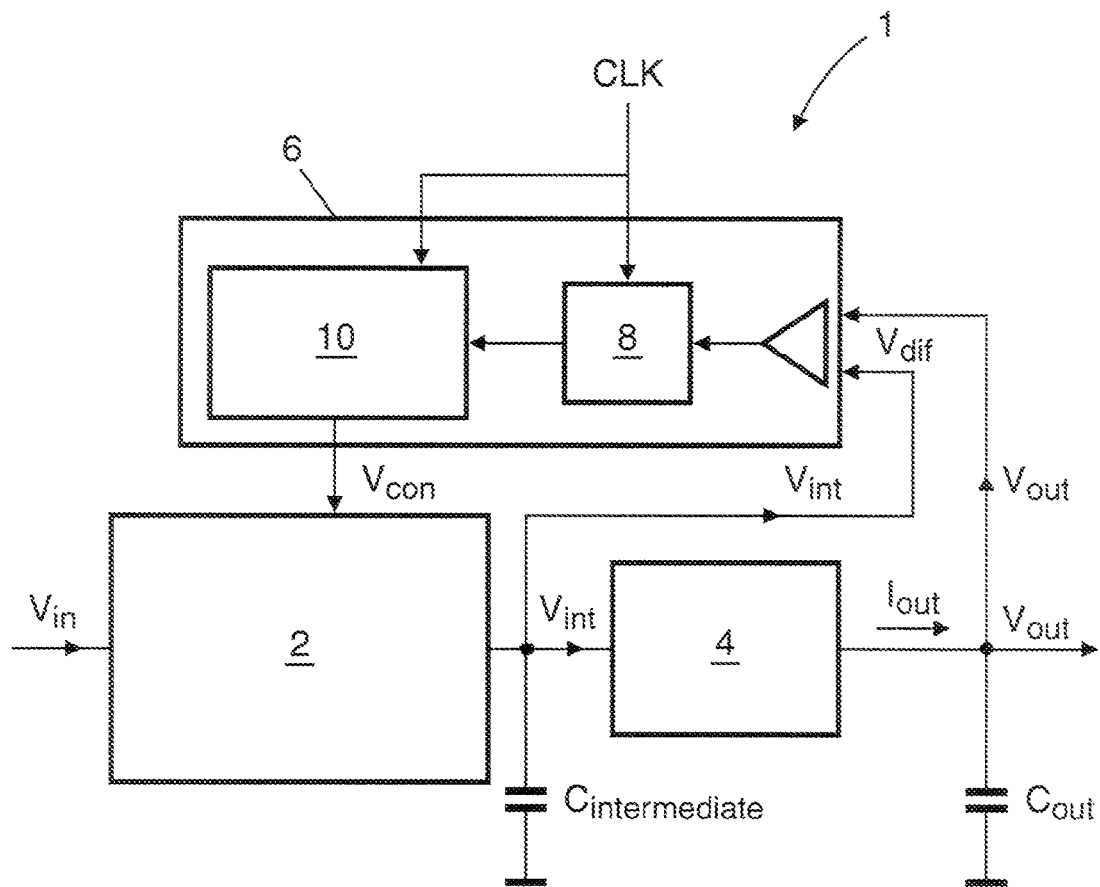
FIG. 3 is a schematic block diagram/circuit diagram showing further details of a particular implementation of the DC voltage converter.

FIG. 3 is a schematic block diagram/circuit diagram showing further details of a particular implementation of the DC voltage converter 1.

The controller 6, which in this example is a system controller, comprises an Analog-to-Digital Converter (ADC) 8 and a digital processor 10. The controller measures the voltage difference $V_{dif}$ across the linear voltage regulator 4, i.e. $V_{dif}=V_{int}-V_{out}$. The ADC 8 digitizes the voltage difference $V_{dif}$ across the linear voltage regulator 4. The digital processor 10 compares this difference to voltages related to the minimum voltage difference $V_{min}$, close or equal to the drop-out voltage of the linear voltage regulator 4, and maximum voltage difference $V_{max}$, chosen to maximize system efficiency as much as possible. An internal state machine operated by the digital processor 10 and where required memory and so on (not shown) is commanded to switch to higher ratios as long as the voltage difference $V_{dif}$ remains below $V_{min}$. Similarly, as long as $V_{dif}$ remains above $V_{max}$ the internal state machine is commanded to switch to lower ratios. The timing can be determined by the clock signal (shown in FIG. 3 as CLK) or a derivative thereof. For example, following an UP signal to the state machine, the conversion ratio of the multi-ratio capacitive converter 2 is switched to a higher ratio, as a result of which $V_{int}$ is increased. In case the multi-ratio capacitive converter 2 is an up converter, the ratio N increases from a value x>1 to the value y>x. In case the multi-ratio capacitive converter 2 is a down converter, the ratio N increases from a value v<1 to the value w>v. Depending on the required output voltage $V_{out}$ and the input voltage range Vin, the multi-ratio capacitive converter 2 may also contain a range of ratios ranging from the smallest value v<1 to the biggest value y>1. In that case an auto up-down converter can be constructed. Let us denote the output impedance of the multi-ratio capacitive converter 2 $Z_{N,out}$, where the chosen conversion ratio of the multi-ratio capacitive converter 2 is denoted as N. Also, as shown in FIG. 3, the output current of the linear voltage regulator 4 is denoted $I_{out}$. Then the following equations apply:

$$V_{int}=NV_{in}-I_{out}Z_{N,out}$$

$$V_{min}<V_{int}-V_{out}<V_{max}$$

These equations show that the output voltage of the multi-ratio capacitive converter 2 itself, $V_{int}$, varies both with $V_{in}$ and $I_{out}$.

Figure 4:
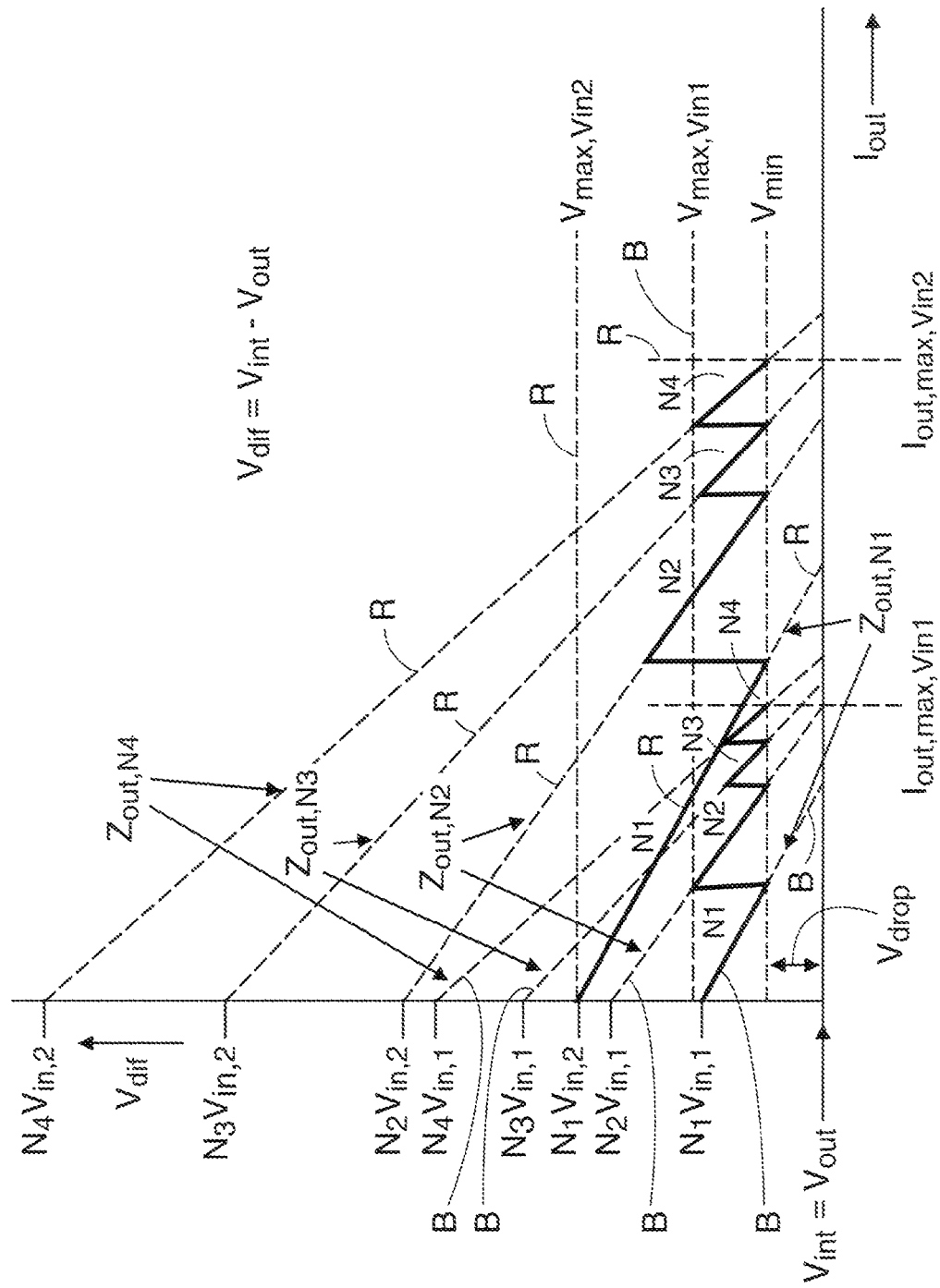
FIG. 4 is a plot (not to scale) illustrating the dependence of $V_{dif}$ on the output current $I_{out}$ and the input voltage $V_{in}$.

Further details of the operation and behaviour of the DC voltage converter 1 shown in FIG. 3 will now be described with reference to FIG. 4. FIG. 4 is a plot (not to scale) illustrating the dependence of $V_{dif}$, i.e. the voltage difference across the linear voltage regulator 4, on the output current $I_{out}$ and the input voltage V. Here a multi-ratio capacitive converter 2 having four different ratios is considered N1 . . . N4, where all ratios are considered to be equidistant, e.g. N1=1, N2=2, N3=3, N4=4, or N1=0.2, N2=0.4, N3=0.6, N4=0.8, etc. It is assumed here for the sake of clarity of explanation and ease of understanding that the smallest ratio will have the lowest output impedance. Therefore, the negative slope of the load lines for the increasing ratios N1 . . . N4 will increase in a manner as indicated in FIG. 4. In practice, the slopes $Z_{out,N1}$ . . . $Z_{out,N4}$ should be chosen in accordance with the corresponding circuit topologies used to implement the respective ratios N1 . . . N4. The use of four different ratios is particularly suitable, for example, for Li-ion battery powered applications and output voltages in the range of 1V. It will however be appreciated that in other embodiments other different numbers of ratios may be provided. Also, although in the above account the different ratios have been made equidistant for ease of illustration and understanding, in practice this will not typically be the case, and thus it will be appreciated that in other embodiments non-equidistant ratio spacings are employed.

The lines indicated by the letter "B" show the situation for input voltage $V_{in,1}$, whereas the lines indicated by the letter "R" show the situation for input voltage $V_{in,2}$. The load lines for each ratio have been drawn for both input voltages. Load lines corresponding to the same ratio have the same slope, e.g. two lines with the same slope for $Z_{out,N1}$, two for $Z_{out,N2}$, etc. On the voltage axis, both the minimum voltage difference $V_{min}$ as well as the maximum voltage difference $V_{max}$ have been indicated. As will be explained below, the maximum voltage difference should be made a function of $V_{in}$ to ensure proper definition of $V_{out}$ for both UP and DOWN conversions of the state machine without the necessity to measure current $I_{out}$. Also, the drop-out voltage is indicated in FIG. 4 as $V_{drop}$.

Let us first consider the situation for input voltage $V_{in,1}$ (lines indicated by the letter "B"). If the load current $I_{out}$ is increased, the solid "B" line indicates that the next higher ratio is chosen until a ratio is found where $V_{dif}$ remains higher than $V_{min}$. This is indicated by the steep edges in the sawtooth curve. When now the load current is decreased, a DOWN signal needs to be generated to the state machine. As can be clearly seen from FIG. 4, the voltage peaks in the "B" curve indicating the changes in ratio are not on the same voltage level for each ratio change. This is caused by the difference in output impedance for each ratio. If $V_{max}$ would be chosen lower than the indicated level $V_{max,Vin1}$, a problem would arise for ratio N2 and decreasing output current. The converter would switch to ratio N1 for a higher output current in that case than indicated in FIG. 4, leading to a voltage $V_{dif}$ lower than $V_{min}$ for ratio N1 at that output-current level. Optionally, the value of $V_{max}$ may be made dependent on the chosen ratio, such that in this particular case lower $V_{max}$ values could be used for ratios N3 and N4. This would imply additional complexity, but would also lead to a higher efficiency, since the difference in voltage across the linear regulator would remain lower.

Similar behaviour is seen when the input voltage is increased to $V_{in,2}$ ("R" lines). Again, when only one $V_{max}$ value is used, $V_{max,Vin2}$ incorrect shifting down in ratio is prohibited at the cost of efficiency. Like for other $V_{in}$ values, optionally $V_{max}$ may be made dependent on the ratio. In all these cases, $V_{max}$ is preferably defined based on the designed ratios and output impedance. Preferably enough tolerance should be taken into account here to prevent ratio down transitions where $V_{dif}$ would drop below $V_{min}$.

Turning now to another consideration that may arise, any ripple on the output of the multi-ratio capacitive converter (acting as a charge pump) should not trigger the controller. When necessary or desirable, this effect may be prevented by any suitable means. One possibility is to make the voltage window large enough to accommodate any ripple. Another possibility is to filter the output of the multi-ratio capacitive converter before feeding it to the controller.

In the above embodiments any suitable multi-ratio capacitive converter 2 may be used. Particular examples are as described for example in the following two articles, where analytical methods are also developed to realize a capacitive converter with multiple ratios with a minimum of hardware. In particular, for example, as shown in and described with regard to FIGS. 6 and 7 of article [1]. The contents of these two articles are incorporated herein by reference.

[1] M. S. Makowski, D. Maksimovic, "Performance limits of switched-capacitor DC-DC converters", 26th Annual IEEE Power Electronics Specialists Conference (PESC), vol. 2, PESC'95, pp. 1215-1221.

[2] M. S. Makowski, "Realizability conditions and bounds on synthesis of switched-capacitor DC-DC voltage multiplier circuits", IEEE Trans Circ. Syst. I, vol. 44, no. 8, pp. 684-691, August 1997

The above embodiments can further be understood as follows. A capacitive voltage converter is used in series with a linear voltage regulator. The capacitive converter is used for a coarse conversion of the input voltage into a suitable intermediate voltage that can either be larger or smaller than the input voltage (up or down conversion). This intermediate voltage is then transformed into the desired output voltage by a series linear voltage regulator, irrespective of the input voltage or output load current. The controller of the capacitive converter is designed such that the difference between intermediate voltage and output voltage, i.e. the voltage difference over the linear voltage regulator, is controlled. Preferably this is minimized for optimum efficiency. This is achieved by changing the voltage-conversion ratio of the capacitive converter based on measurement of the voltage difference across the linear regulator. For example, the controller may include a state machine, and the state machine in the controller may be commanded to increase or decrease the conversion ratio when the measured voltage difference across the linear regulator falls outside a defined voltage window.

Particularly advantageous embodiments of the present invention are in applications where there are a relatively large number of voltage conversions, especially when they are to different output voltage values and/or the input voltage level varies, as is often the case in mobile devices for example.

Another particularly advantageous embodiment is to integrate high-density floating capacitors with an active die in a single package, by using for example a passive-integration process with high-density capacitors based on trench-MOS.

Thus the above described embodiments tend to provide a DC voltage converter in which the voltage across the linear voltage regulator is minimized by switching to the appropriate state of the multi-ratio capacitive converter based on measurement of the voltage difference across the linear voltage regulator. In certain embodiments this voltage difference is controlled to remain within a voltage window.

The above described embodiments tend to provide one or more of the following advantages.

The above embodiments do not need to include an inductor, which is an advantage when integration of passives is concerned, since integrating inductors with good quality is difficult.

Compared to a single multi-ratio capacitive converter, the overall DC voltage converter allows better control over the output voltage. Simulation experiments have shown that relatively high efficiencies, at least comparable to those for integrated inductive converters, are possible at much lower switching frequencies than for integrated inductive converters.

Another advantage is that lower-cost devices/capacitors can be used, i.e. with smaller capacitance, which would normally lead to more ripple at the output voltage. In the above embodiments, the voltage ripple at the output of the multi-ratio capacitive converter is reduced using the linear voltage regulator while tending to maintain efficiency.

The invention claimed is:

1. A DC voltage converter, comprising:
   a multi-ratio capacitive converter;
   a linear voltage regulator in series with the multi-ratio capacitive converter; and
   a controller;
   the controller arranged to control the ratio between the input voltage of the multi-ratio capacitive converter and the output voltage of the multi-ratio capacitive converter dependent upon the voltage difference between the output voltage of the linear voltage regulator and the input voltage of the linear voltage regulator.

2. A DC voltage converter according to claim 1, wherein the controller controls the ratio of the multi-ratio capacitive converter such as to maintain the voltage difference across the linear voltage regulator within a predetermined voltage window.

3. A DC voltage converter according to claim 1, wherein the predetermined voltage window is between a minimum voltage which is the drop-out voltage or close to and above the drop-out voltage of the linear voltage regulator, and a maximum voltage.

4. A DC voltage converter according to claim 3, wherein the maximum voltage is dependent on the ratio of the multi-ratio capacitive converter.

5. A DC voltage converter according to claim 1, wherein the controller controls the ratio of the multi-ratio capacitive converter such as to minimise the voltage difference across the linear voltage regulator.

6. A DC voltage converter according to claim 1, wherein the controller controls the ratio of the multi-ratio capacitive converter such as to control the voltage difference across the linear voltage regulator to be close to and above the drop-out voltage of the linear voltage regulator.

7. A DC voltage converter according to any of claim 1, wherein the controller comprises an analogue to digital converter and a digital processor.

8. A DC voltage converter according to claim 1, wherein the controller comprises an internal state machine.

9. A DC voltage converter according to claim 1, wherein the multi-ratio capacitive converter has four different ratios.

10. A DC voltage converter according to claim 1, further comprising means for accommodating ripple on the output of the multi-ratio capacitive converter.

11. A method of converting DC voltage, the method comprising:
   inputting an input voltage to a multi-ratio capacitive converter;
   the multi-ratio capacitive converter converting the input voltage to an intermediate voltage;
   feeding the intermediate voltage to a linear voltage regulator and also to a controller;
   the linear voltage regulator regulating the intermediate voltage to an output voltage;
   feeding the output voltage to the controller and also providing the output voltage as the overall output voltage; and
   the controller controlling the ratio of between the input voltage of the multi-ratio capacitive converter and the intermediate voltage of the multi-ratio capacitive converter dependent upon the difference between the output voltage of the linear voltage regulator and the intermediate voltage of the multi-ratio capacitive converter.

12. A method according to claim 11, wherein the controller controls the ratio of the multi-ratio capacitive converter such as to maintain the difference between the output voltage and the intermediate voltage within a predetermined voltage window.

13. A method according to claim 12, wherein the predetermined voltage window is between a minimum voltage which is the drop-out voltage or close to and above the drop-out voltage of the linear voltage regulator, and a maximum voltage.

14. A method according to claim 11, wherein the controller controls the ratio of the multi-ratio capacitive converter such as to minimise the difference between the output voltage and the intermediate voltage.

15. A method according to claim 11, wherein the controller controls the ratio of the multi-ratio capacitive converter such as to control the difference between the output voltage and the intermediate voltage to be close to and above the drop-out voltage of the linear voltage regulator.

* * * * *